(No Model.)
C. PLOCHER.
Indicator for Baker's Ovens.
No. 227,650. Patented May 18, 1880.
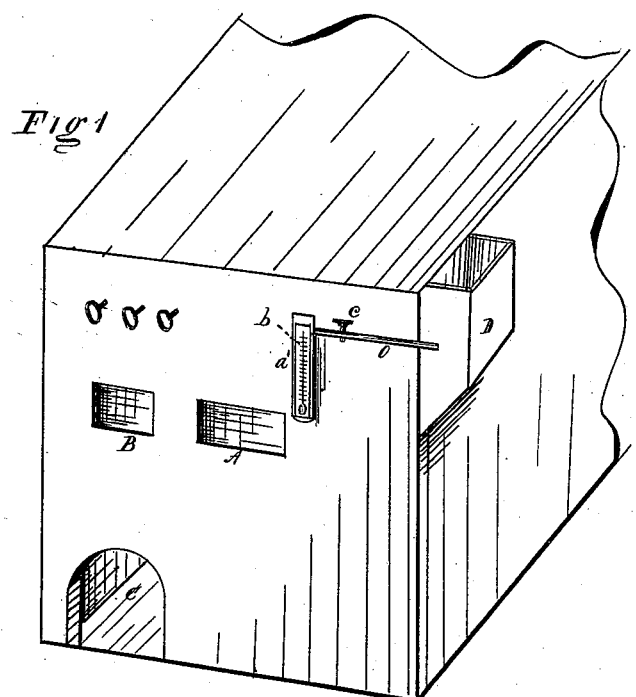
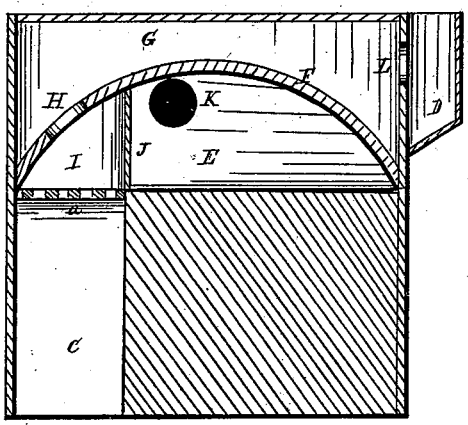
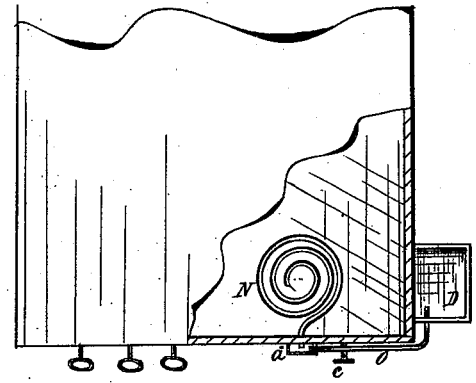
Witnesses.
Inventor.

UNITED STATES PATENT OFFICE.

CHRISTIAN PLOCHER, OF CLEVELAND, OHIO.

INDICATOR FOR BAKERS' OVENS.

SPECIFICATION forming part of Letters Patent No. 227,650, dated May 18, 1880.

Application filed March 20, 1880. (No model.)

*To all whom it may concern:*

Be it known that I, CHRISTIAN PLOCHER, of Cleveland, in the county of Cuyahoga and State of Ohio, have invented a certain new and improved Indicator for Bakers' Ovens; and I do hereby declare that the following is a full, clear, and complete description thereof.

This invention relates to bakers' ovens, and the object thereof is to indicate the heat of the oven by an external indicator, so that the proper time for placing the article to be baked therein may be known without opening the door and thrusting the hand into the oven for that purpose.

The following is a full and complete description of the above-said invention, reference being had to the accompanying drawings, making a part of this specification, in which—

Figure 1 represents a perspective view of the oven. Fig. 2 is a vertical transverse section. Fig. 3 is a sectional plan view of the inside.

Like letters of reference refer to like parts in the several views.

To bake different articles, such as bread, crackers, cakes, &c., made by bakers, requires different degrees of heat—that is to say, a particular degree of heat is necessary for each kind of article, one article requiring more heat than another and of longer duration. To ascertain this specific degree of heat the door of the oven is opened and the hand is extended therein as far as possible. Those accustomed to this can generally tell nearly the proper time at which to put the things into the oven. The hand, however, is not a good thermometer, as it is not always equally sensitive to the same degree of heat. Hence it is unreliable for that purpose, and in consequence it not unfrequently happens that the oven is either too hot or too cold for the article to be baked, in view of which the baking is either overdone or underdone, with a consequent deterioration or loss of the article.

On opening the oven-door in order to ascertain the heat of the oven, cold air immediately rushes in. Hence the hand can feel the heat near the door only, which must be of lower temperature than that farther in.

It will be obvious from the above that an approximation only of the heat can be had for baking any one kind of article by using the hand for the purpose above said. Hence the proper degree of heat is much a matter of conjecture.

To avoid this conjecture and to know when the oven is at the required temperature for any one particular kind of article is the purpose of this invention. To this end is used a thermometer, arranged in relation to the oven as hereinafter described. For a proper understanding of this matter a brief description of an oven will be made.

In the drawings, Figure 1 represents an external view of an oven, of which A is the oven-door; B, the door of the fire-place; C, the ash-pit, and D the chimney.

In Fig. 2, E represents the oven proper, of which F is the arch, G a flue-space above the arch. Said space communicates with the oven by an aperture, H, directly over the fire-place I, which is divided from the oven by a partition, J, which extends no farther back than to the end of the grate-bars $a$ of the fire-place. The oven also communicates with the flue-space G by a rear aperture, K. Said space opens into the chimney D by an outlet, L.

The above briefly-described oven is or may be like those in ordinary use or a modification thereof. It is not essential as to the exact construction of the oven to which the improvement may be applied.

To the wall, directly outside of the oven, is secured an elongated case or shell, $a'$, having a glass face. In said case, so as to be seen through the glass of the case, is secured a thermometer, $b$. In the oven, a short distance above the floor thereof, is fixed in the wall one end of the coiled pipe N. The end of the pipe penetrates the wall and terminates in the lower end of the thermometer-case $a'$ alluded to.

$o$ is a pipe, one end of which opens into the upper end of the thermometer-case, whereas the opposite end of the pipe extends to and terminates in the chimney D, substantially as seen in the drawings.

The practical operation of the above is as follows: When the oven becomes heated the hot air therein passes through the coil of pipe N into the case $a'$, near the bulb of the thermometer. The heated air is retained in the case by a stop-cock, $c$, in the pipe $o$. The heated air in the case coming directly from the oven, the temperature of the oven will be indicated by the thermometer, and that to an exactness unattainable by the ordinary means—viz., the hand, as above described.

In the event that the oven is too hot it can be cooled down in the usual manner by opening the oven-door or by closing the dampers of the fire-place, and the heated air in the case can be allowed to pass off into the chimney through the pipe $o$ by opening the cock $c$.

It will be obvious from the above that the exact degree of heat required to bake any particular kind of breadstuff can be easily and readily known without opening the oven-door for that purpose, which, in every instance, is attended with more or less loss of heat.

What I claim as my invention, and desire to secure by Letters Patent, is—

The case $a'$, having therein a thermometer pipe N, and pipe $o$, all constructed as described, and attached to and arranged in relation to an oven substantially as set forth, and for the purpose specified.

In evidence whereof I, the said CHRISTIAN PLOCHER, do hereunto subscribe my name in the presence of two witnesses.

CHRISTIAN PLOCHER.

Witnesses:
J. H. BURRIDGE,
J. H. SWEENEY.